(12) United States Patent
Al Tarabsheh et al.

(10) Patent No.: US 11,689,146 B2
(45) Date of Patent: Jun. 27, 2023

(54) DEFORMABLE MODEL FOR PERFORMANCE ENHANCEMENT OF PHOTOVOLTAIC-WIND HYBRID SYSTEM

(71) Applicant: Abu Dhabi University, Abu Dhabi (AE)

(72) Inventors: Anas I. Q. Al Tarabsheh, Abu Dhabi (AE); Mohammad A. Ghazal, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 24 days.

(21) Appl. No.: 17/384,792

(22) Filed: Jul. 25, 2021

(65) Prior Publication Data
US 2023/0023339 A1    Jan. 26, 2023

(51) Int. Cl.
*H02S 10/12*    (2014.01)
*H02S 20/32*    (2014.01)

(52) U.S. Cl.
CPC .............. *H02S 10/12* (2014.12); *H02S 20/32* (2014.12)

(58) Field of Classification Search
CPC ................................ H02S 10/12; H02S 20/32
See application file for complete search history.

(56) References Cited

U.S. PATENT DOCUMENTS

| 10,612,522 | B2  | 4/2020  | Tarabsheh |              |
|------------|-----|---------|-----------|--------------|
| 2008/0047270 | A1* | 2/2008 | Gilbert   | F03D 9/11    |
|            |     |         |           | 60/641.12    |
| 2016/0344330 | A1* | 11/2016 | Gillis   | H02S 20/32   |
| 2018/0372073 | A1* | 12/2018 | Al Tarabsheh | F03D 3/005 |

OTHER PUBLICATIONS

Nguyen, Non-Final Office Action, dated Jul. 5, 2022, pp. 1-7, U.S. Patent and Trademark Office.

\* cited by examiner

*Primary Examiner* — Jayne L Mershon

(57) ABSTRACT

An apparatus includes a rotating pole, a first set of photovoltaic modules; and a second set of photovoltaic modules. The second set of photovoltaic modules do not rotate with the rotating pole.

14 Claims, 16 Drawing Sheets

DEFORMABLE MODEL FOR PERFORMANCE ENHANCEMENT OF PHOTOVOLTAIC-WIND HYBRID SYSTEM

BACKGROUND

Wind turbines convert wind (kinetic) energy into electrical energy via a gear box and a generator, or mechanical power. The electricity may then be distributed for use in an end user's electric system. In addition to wind turbines, photovoltaic modules or panels convert sunlight into electricity. However, such systems may be affected by weather conditions, such as when there is no wind or sunlight. In addition, elevated temperatures and dust accumulation may impact the electrical performance of such systems. Thus, cooling systems may be used to regulate photovoltaic system temperatures. However, no system currently exists that includes a hybrid solar and wind system that uses less features to maintain the hybrid system's overall temperature. Furthermore, no hybrid solar and wind system currently exists that increases the electricity production capacity of the hybrid solar and wind system.

DETAILED DESCRIPTION OF PREFERRED EMBODIMENTS

The following detailed description refers to the accompanying drawings. The same reference numbers in different drawings may identify the same or similar elements.

Systems, devices, and/or methods describe herein a hybrid system that may use different energy resources, individually or at the same time. In embodiments, the hybrid system may use wind, solar, and/or a combination of wind and solar to generate energy. In embodiments, the hybrid system may include photovoltaic modules that are part of wind turbine blades. In embodiments, the wind turbines may be attached to a shaft that may rotate if wind is present. Thus, the hybrid system may use both wind and solar energy to generate energy. Accordingly, the hybrid system may (a) combine solar panels with wind turbine blades, (b) rotate photovoltaic modules can be self-cooled resulting in greater levels of energy output, (c) have no requirement for a sun tracker system, (d) increase the photovoltaic modules power output as wind turbine blades may reflect sunlight back onto the photovoltaic modules, and (e) reduce dust build-up on the system. In embodiments, the hybrid system may also include additional solar panels that are perpendicularly attached to the wind turbine blades that allow for additional energy output. In embodiments the wind turbine blades (with attached solar panels) may also be adjusted at a particular tilt angle to capture additional solar power.

As such, the hybrid system may use areas on wind blades to incorporate photovoltaic modules which will be self-cooled and result in greater energy output. In addition, the hybrid system described herein does not require a sun tracker and dust build-up in the system is reduced. In doing so, the hybrid system various advantages which include (i) less area utilized for the wind turbine blades and photovoltaic modules, (ii) photovoltaic modules that may move and generate additional power.

Figure 1A:
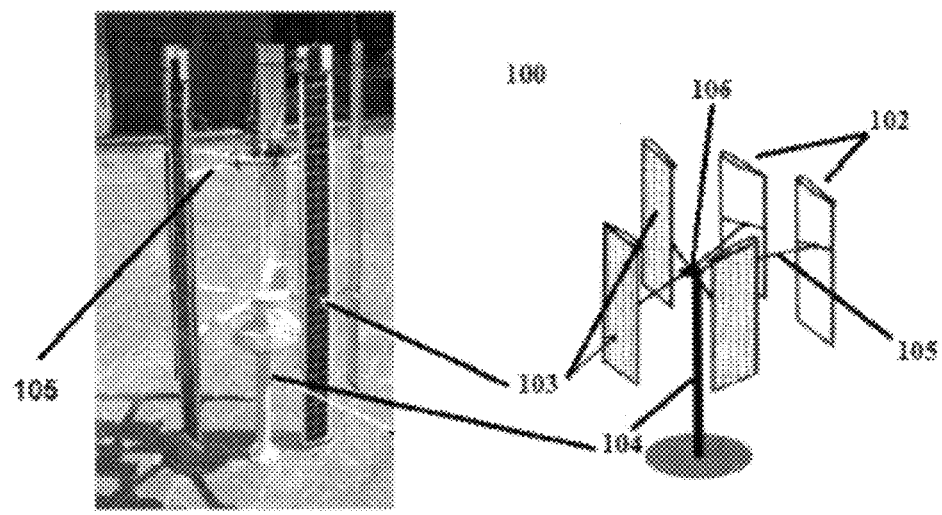
FIG. 1A is an example diagram of a photovoltaic-wind hybrid turbine system.

FIG. 1A is an example diagram of a photovoltaic-wind hybrid turbine system. As shown in FIG. 1A, hybrid system 100 includes photovoltaic (PV) modules 103. In embodiments, PV modules 103 may be constructed of a flexible material that allows for PV modules 103 to be attached to wind turbine blades 102 (hereinafter blades 102). In embodiments, PV modules 103 may also be defined as PV panels. In embodiments, hybrid system 100 may be a vertical-axis wind turbine (VAWT) design. In embodiments, with hybrid system 100 being a VAWT design, hybrid system 100 generates less noise than a horizontal-axis wind turbine (HAWT). In addition, with hybrid system 100 being a VAWT design, lower angular velocity occurs during operation and can accept wind from any direction towards hybrid system 100.

In embodiments, as shown in FIG. 1A, a plurality of PV modules 103 are attached to blades 102 of an H-type VAWT design, with five blades 102 that are separated between each other at an angle of 72 degrees. In embodiments, PV modules 103 may be constructed of a material that can be bent up to an angle of 30 degrees to allow for conformity to any curvatures of blades 102. In embodiments, dimensions of PV modules 103 may match that of blades 102 so that the aerodynamics of the wind turbine portion of hybrid system 100 are not affected (i.e., minimized).

Figure 1B:
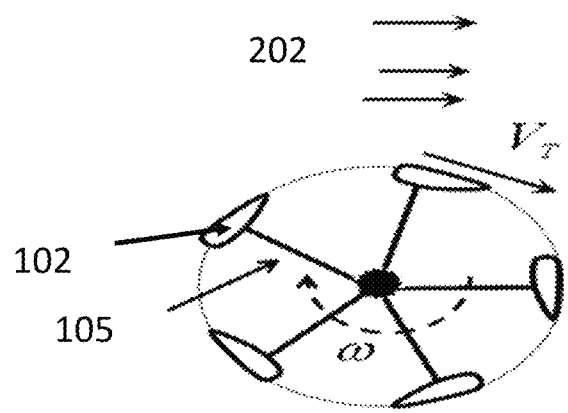
FIG. 1B is an example top perspective view of a photovoltaic-wind hybrid turbine system.

FIG. 1B shows an example top perspective view of hybrid system 100. Wind speed $V_{wind}$ 200 is shown in FIG. 1B. In embodiments, hybrid system 100, as shown in FIGS. 1A and 1B, will not see an increase in temperature due to absorbed solar radiation as blades 102 are rotating and any generated heat is exchanged with the surrounding environment at a rate faster than if PV modules 103 were stationary. In embodiments, hybrid system 100 is a self-cooling system with no extra power consumption needed for the self-cooling. As PV modules 103 cool down the system, the overall performance of hybrid system 100 is increased. In addition, attaching PV modules 103 to blades 102, there is a reduction of dust accumulation on hybrid system 100.

In embodiments, wind may cause blades 102 to rotate which then results in the rotation of shaft 104. In embodiments, blades 102 are connected to a central axis of shaft 103 through a plurality of radial arm structures 105. In embodiments, shaft 104 may be electrically connected to a generator (e.g., an alternator) which may be located at the bottom of shaft 104. In alternate embodiments, a three-phase alternating current (AC) permanent magnet generator may be located at the bottom of shaft 104. In embodiments, magnets (e.g., neodymium magnets) may be used instead of excitation coils that are used in synchronous generators. In embodiments, the generator converts any rotational energy of blades 102 into electricity. In embodiments, hybrid system 100 does not require a sun tracker since at least one rotating PV module 103 is facing the sun at any given time. In addition, a plurality of blades 102 may reflect sunlight back towards other PV modules 103. As such, hybrid system 100 can generate additional power.

Considering a preferred embodiment of the present invention, the photovoltaic modules or panels 103 are integrated with the H-type vertical-axis wind turbine (VAWT) consisting of five blades 102, each blade with a height (h) of 0.745 m and a width (w) of 0.08 m. A rotor 106 of the wind turbine has a diameter (d) of 0.56 m. The wind has a speed of V wind (in m/s) which rotates the central axis of rotation or rotating shaft 104 with a speed N (in RPM) at a rotation frequency (in rad/s) of ω

$$\omega = N \frac{2\pi}{60}$$

and the resulting turbine speed (in m/s) will be $$V_T = \omega \frac{d}{2}$$

Figure 2A:
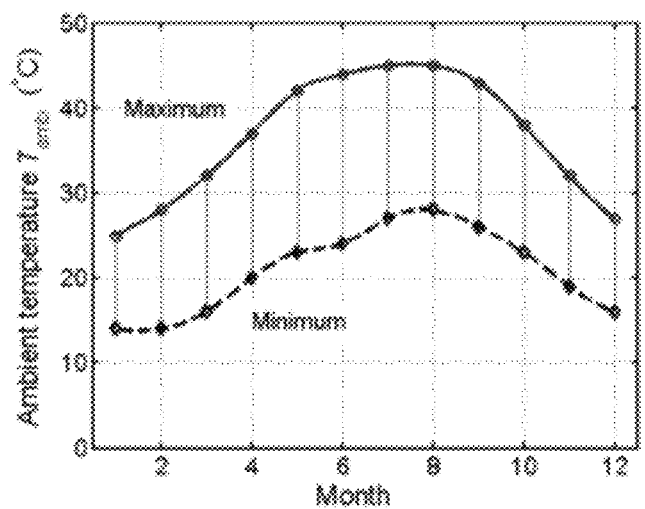
FIG. 2A is an example graphical representation of maximum and minimum values of ambient temperatures by month.
Figure 2B:
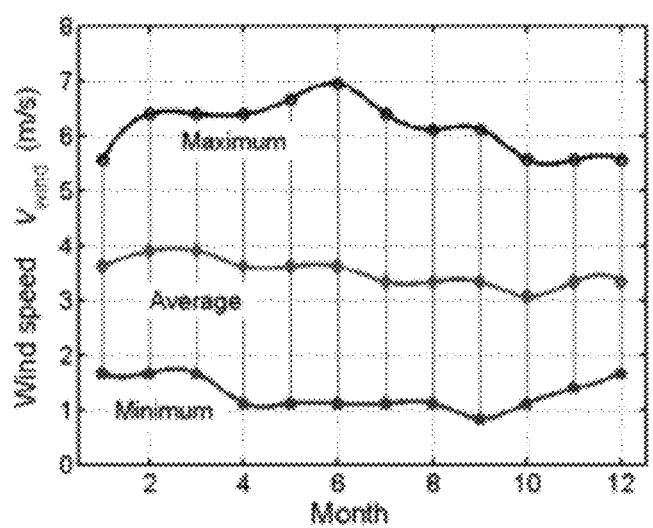
FIG. 2B is an example graphical representation of maximum average and minimum values of wind speed.

FIG. 2A shows an example graphical representation of maximum and minimum values of ambient temperatures by month. FIG. 2B is an example graphical representation of maximum average and minimum values of wind speed. In a non-limiting example, hybrid system 100 is tested based on the temperature and wind speed information provided in FIGS. 2A and 2B. In embodiments, FIG. 2A shows temperatures as they vary during each month with minimum and maximum temperatures shown. FIG. 2B shows maximum, average, and minimum wind speeds during each month. In this non-limiting example, FIGS. 2A and 2B are showing temperature and wind information in Abu Dhabi.

In embodiments, hybrid system 100, as being used in Abu Dhabi in this non-limiting example, includes PV modules 103 that absorb sunlight and generate power at the same time that blades 102 generate rotational power, when rotated by wind, which is then converted to electrical power via shaft 104. In embodiments, power generated from PV modules 103 and blades 102 is integrated together via a hybrid charge collector (HCC). In embodiments, direct current (DC) power is generated from PV modules 103 while AC power is generated from blades 102. In embodiments, HCC controls and mixes the generated DC and AC power and then stores the resultant power in a battery.

Figure 3A:
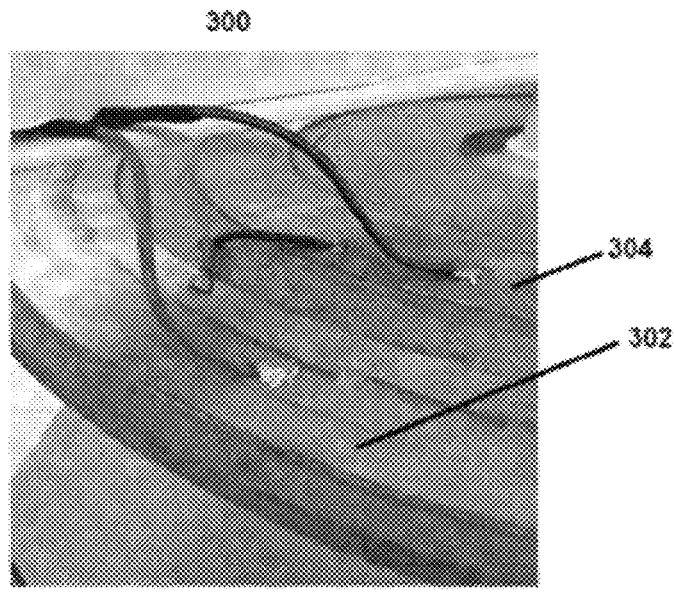
FIG. 3A is an example slip ring.
Figure 3B:
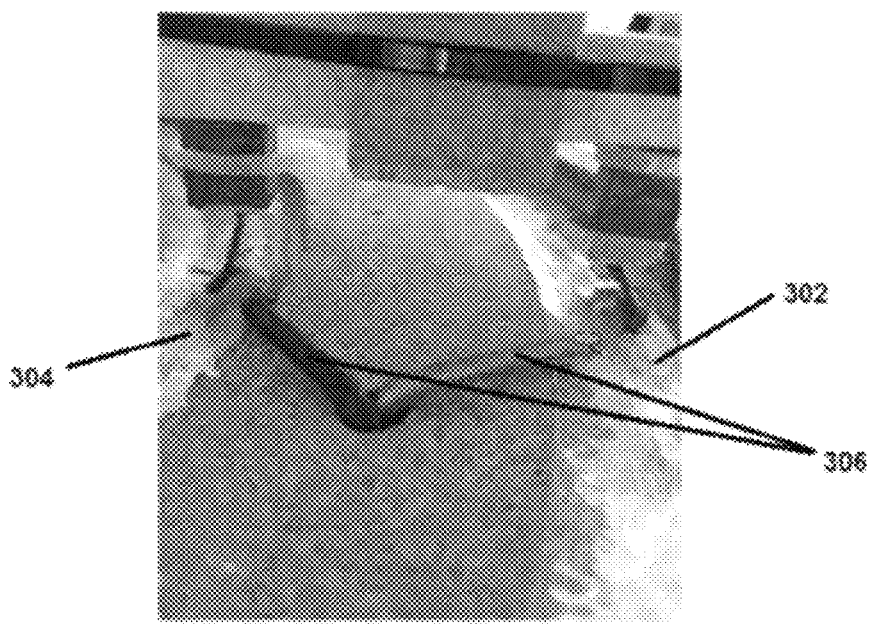
FIG. 3B is an example electrical brushing.

In embodiments, due to the rotation of blades 102 along with PV modules 103, electrical brushing may be used to collect electrical power generated from PV modules 103. In embodiments, electrical brushing is a process by which moving or rotating parts are electrically connected to stationary parts by brushing stationary wires on the moving parts. In embodiments, slip rings may be manufactured using two double-sided copper plates and a wooden board. FIGS. 3A and 3B show slip ring 300 with electrical brushes. As shown in FIG. 3A, outer ring 302 of slip ring 300 is used for positive terminals of PV modules 103 and inner ring 304 is used for negative terminals of PV modules 103. On another side of slip ring 300, two stationary wires 306 brush on the outer ring 302 and inner ring 304 which results in electrical current being passed to HCC and then to a battery.

In embodiments, an HCC may be connected to batteries (e.g., 12-volt batteries). In embodiments, output voltage and front side temperature values of PV modules 103 is analyzed and recorded using a microcontroller which is fixed to the top of rotor 106. In embodiments, a temperature T of PV modules 103 is determined by an ambient temperature ($T_{amb}$) and incoming solar radiations, $\phi$, such that the higher the solar radiations, the larger the temperature T will be for ambient temperatures.

In embodiments, a Maximum Power Point Tracking (MPPT) is an algorithm that is included in charge controllers for extracting maximum available power from PV modules 103. In embodiments, the voltage at which a PV module 103 can produce maximum power is called maximum power pint (e.g., peak power voltage). In embodiments, for hybrid system 100, MPPT is used to increase the efficiency of PV modules 103. In embodiments, MPPT may be used a voltage regulator in a circuit that limits the amount of current being used to charge a battery and the amount of current being drawn from a battery in order to avoid damage to the battery. Thus, since PV modules 103 output more voltage than a battery can require for charging, hybrid charge controller (HCC) converts excess voltage, coming from PV modules 103, into current which results in optimized charging and the amount of time to charge the battery is reduced.

Figure 4A:
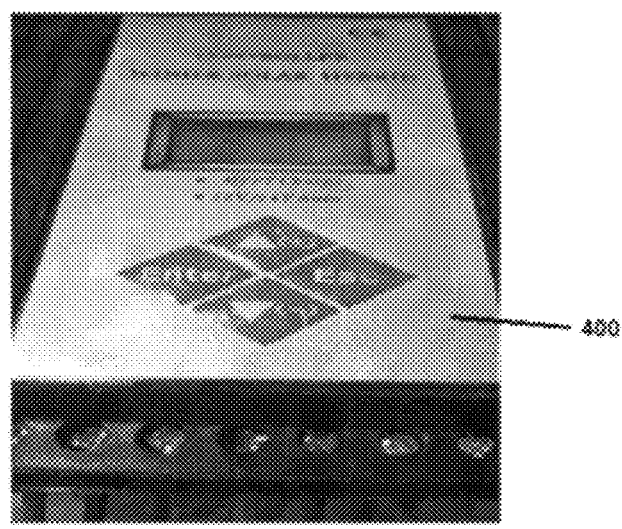
FIG. 4A is an example hybrid charge controller (HCC)
Figure 4B:
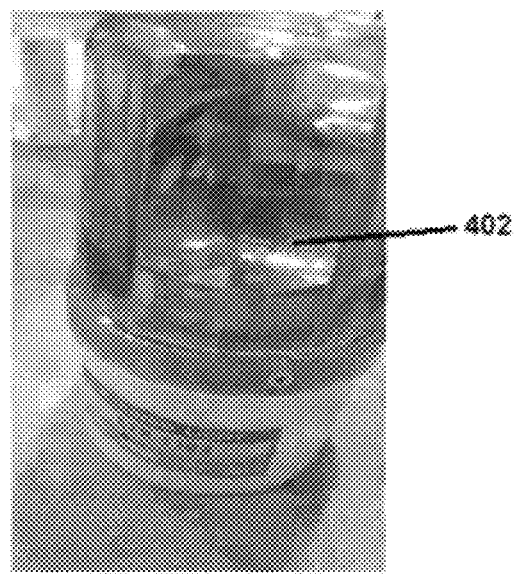
FIG. 4B is an example load or warning light system.

FIG. 4A shows an example HCC. In embodiments, when a battery being charged by hybrid system 100 gets full, hybrid system 100 may continue to charge the battery. In embodiments, HCC 400 may (1) turn on and divert energy to a load or a warning light 402 as shown in FIG. 4B. In embodiments, when the battery discharges, HCC 400 may turn off allowing hybrid system 100 to continue charging the battery. In embodiments, warning light 402 may be a 10-watt warning light that voltage from hybrid system 100 is being diverted.

In embodiments, the H-type vertical-axis wind turbine (VAWT) consisting of five blades 102 has a maximum power of 75 W, each blade with a height (h) of 0.745 m, a width (w) of 0.08 m and a rotor diameter (d) of 0.56 m. The swept turbine area A is given by A=h×d=0.417 m². Power absorbed by the turbine $P_T$ is expressed as:

$$P_T = \frac{1}{2} \times Cp \times d \times h \times \rho \times V_{wind}^3$$

wherein Cp is the aerodynamic power coefficient, ρ=10225 kg/m3 is the air density, and $V_{wind}$ is the wind speed.

Figure 5:
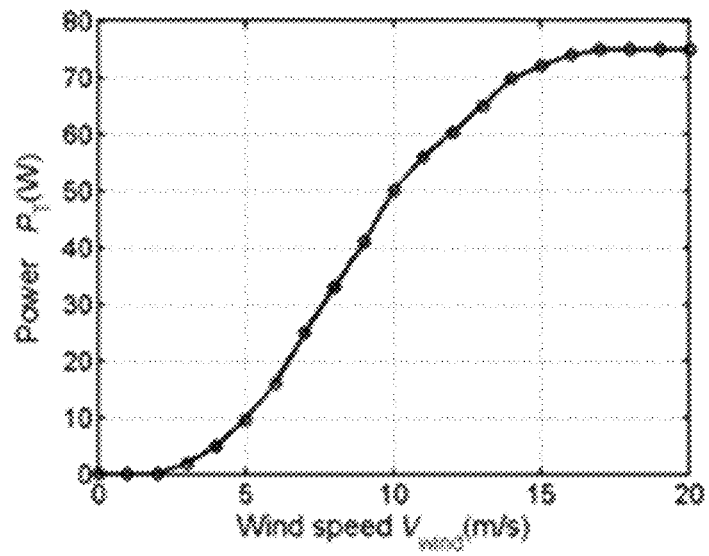
FIG. 5 is an example graphical representation of measured photovoltaic modules or panels' surface temperature.

FIG. 5 shows example graphical representation of measured photovoltaic modules or panels' surface temperature. As shown in FIG. 5, a power characteristic curve is shown with wind speed versus power. In embodiments, FIG. 5 shows a curve where no power is produced when the wind speed is below a particular threshold, such as 2 m/s as shown. As shown in FIG. 5, the maximum power is generated at around 17 m/s. Also, as shown in FIG. 5, power increases at a much faster rate between 5 m/s and 10 m/s than the rate of power increases after 10 m/s. At higher wind speeds, control of the wind turbine feature is important than increased power at higher rates of wind.

Figure 6:
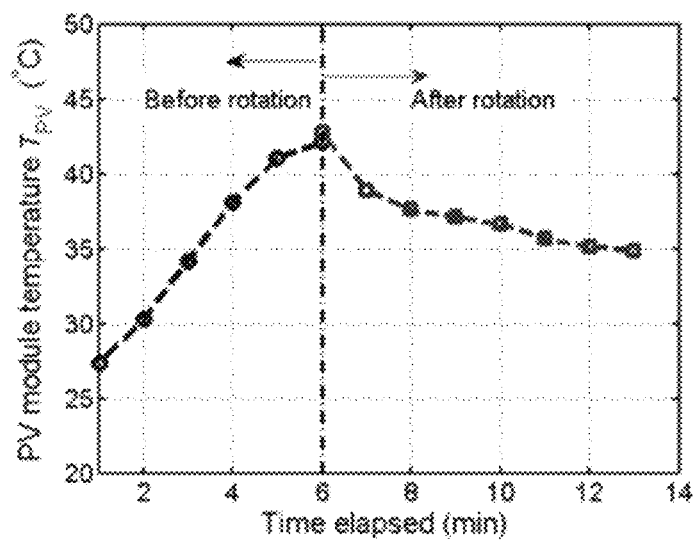
FIG. 6 is an example graphical representation of temperatures prior to and after blade rotations.

FIG. 6 shows is an example graphical representation of temperatures prior to and after blade rotations. As shown in FIG. 6, the electrical characteristics of the photovoltaic modules or panels 103 are displayed in comparison before and after rotation of the H-type vertical-axis wind turbine (VAWT). A comparison of the measured photovoltaic modules or panels' surface temperature prior to rotation of the plurality of blades 102 (stationary state) and after rotation of the plurality of blades 102 of the H-type vertical axis wind turbine (VAWT) is compared in FIG. 6. This comparison helps to evidence the enhancement of effectiveness or performance of the photovoltaic modules or panels 103 when the plurality of blades 102 commence to rotate. As seen in FIG. 6, the temperature of PV modules 103 decreases (experimentally measured from 42° C. to 35° C. in a period of 7 minutes) when the H-type vertical-axis wind turbine (VAWT) starts rotating. Keeping PV modules 103 as fixed, as in a stationary position as in the traditional systems, results in an increased operating temperature of PV modules 103 (experimentally measured from 28° C. to 42° C. in a period of 6 minutes) due to the reason that PV modules 103 continuously absorb solar radiations.

In embodiments, current-voltage characteristics (I/V) of the photovoltaic modules or panels 103 are expressed as:

$$I = I_o \times \left[\exp\left[\frac{V - I \times R_s}{n \times V_{th}}\right] - 1\right] + \frac{V - I \times R_s}{R_p} - I_{sc}$$

wherein V is the applied voltage to the module, I is the resulting current, $V_{th}$=25.9 mV (at room temperature) is the thermal voltage, n is the ideality factor, Ise is the short-circuit current, $R_s$ is the series resistance, $R_p$ is the shunt resistance and $I_o$ is the reverse saturation current. This reverse saturation current I0 is expressed as equation (3):

$$I = I_{o-nom} \times \left[\frac{T_{pv}}{300}\right]^3 e^{\left[\frac{T_{pv}}{300} - 1\right] \times \frac{E_g}{n \times V_{TH}}}$$

Where $I_{o-nom}$ is the reverse saturation current at T=300K. The most affected electrical parameter of the photovoltaic modules or panels 103 is the open-circuit voltage $V_\infty$ that decreases drastically when $T_{pv}$ increases as a result of the absorption of sun radiation. This effect is reflected directly on the electrical efficiency η of the PV modules 103.

Considering equations (2) and (3), open circuit voltage $V_\infty$ is approximated by assuming a reasonable large value of shunt resistance as equation (4):

$$V_{oc} = n \times V_{th} \times \left[\ln\left[\frac{I_{sc}}{I_{o-nom}}\right] - 3 \times \ln\left[\frac{T_{PV}}{300}\right] + \left[\left[\frac{T_{PV}}{300} - 1\right] \times \frac{E_g}{n \times V_{th}}\right]\right]$$

FIG. 7 is a graphical representation of measured and modelled open-circuit voltage plotted against measured photovoltaic modules or panels temperature. As shown in FIG. 7, modelling parameters are set (in MATLAB©) to n=1.3, $I_{o-nom}$=4 nA, $I_{sc}$=175 mA and $E_g$=1.12 eV. This results in a difference of Δ=1.2% between measured and modelled data where Δ is defined in equation (5) as:

$$\Delta = \frac{1}{N}\sqrt{\sum_{i=1}^{N}\frac{(measurement_i - modeled_i)^2}{(measurement_i)^2}}, N = 5 \text{ readings}$$

Figure 7A:
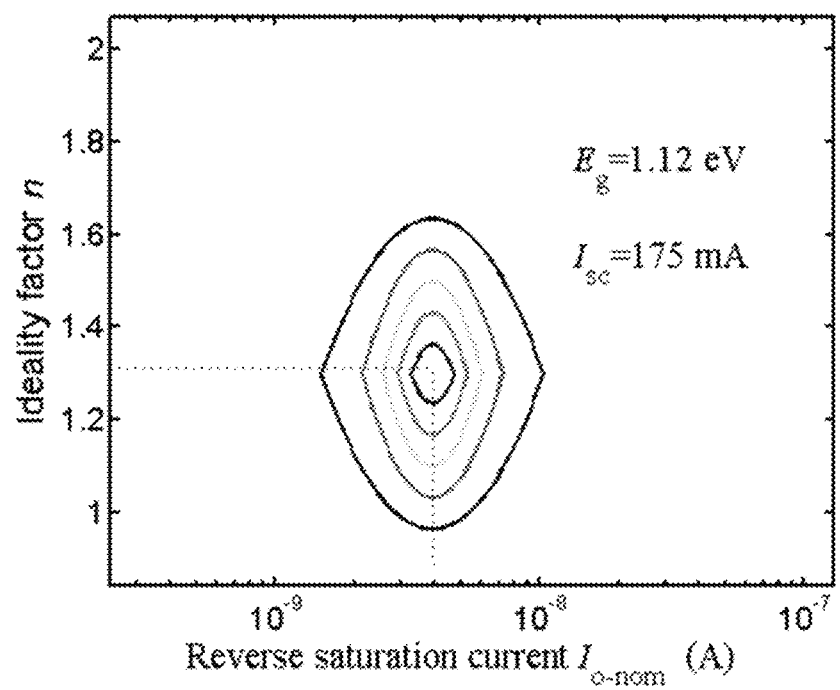
FIG. 7A is an example graphical representation of ideality factor and reverse saturation current.
Figure 7B:
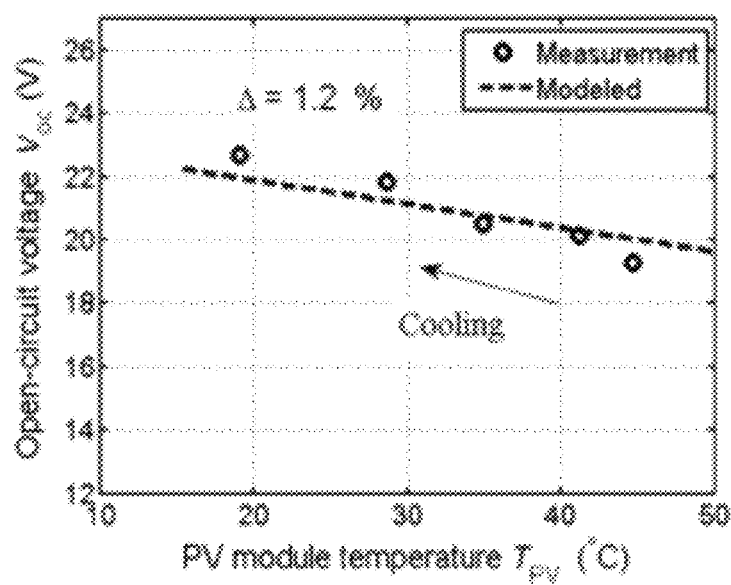
FIG. 7B is an example graphical representation of measured and modeled data.

FIG. 7 also shows that voltage decreases from 22.7 Y to 19.3 Y when temperature of PV modules 103 increases from 19° C. to 44° C. Therefore, cooling PV modules 103 by rotation of the same, increases the output voltage. FIG. 7(b) displays measured and modelled open-circuit voltage plotted against the measured photovoltaic modules or panels temperature. FIG. 7(a) shows optimum values of the ideality factor and reverse saturation current. In accordance with the graph, optimum values of the ideality factor and reverse saturation current are 1.3 and 4 nA, respectively, and FIG. 7(b) shows that the difference between the measured and the modelled data (Δ) is 1.2%.

Accordingly, the benefit of the proposed design over traditional turbine systems is that electrical performance of the rotating PV modules 103 is enhanced due to the self-cooling capability of the rotating PV modules 103 integrated with the plurality of blades 102. It has been experimentally shown that voltage of the PV modules 103 decreases when temperature of PV modules 103 temperature increases. Therefore, cooling of PV modules 103 by rotation increases the output voltage and thus overall performance of the proposed photovoltaic-wind hybrid turbine system 100. This experiment is modelled by four parameters—ideality factor, reverse saturation current, short-circuit current, and material band gap.

Figure 8:
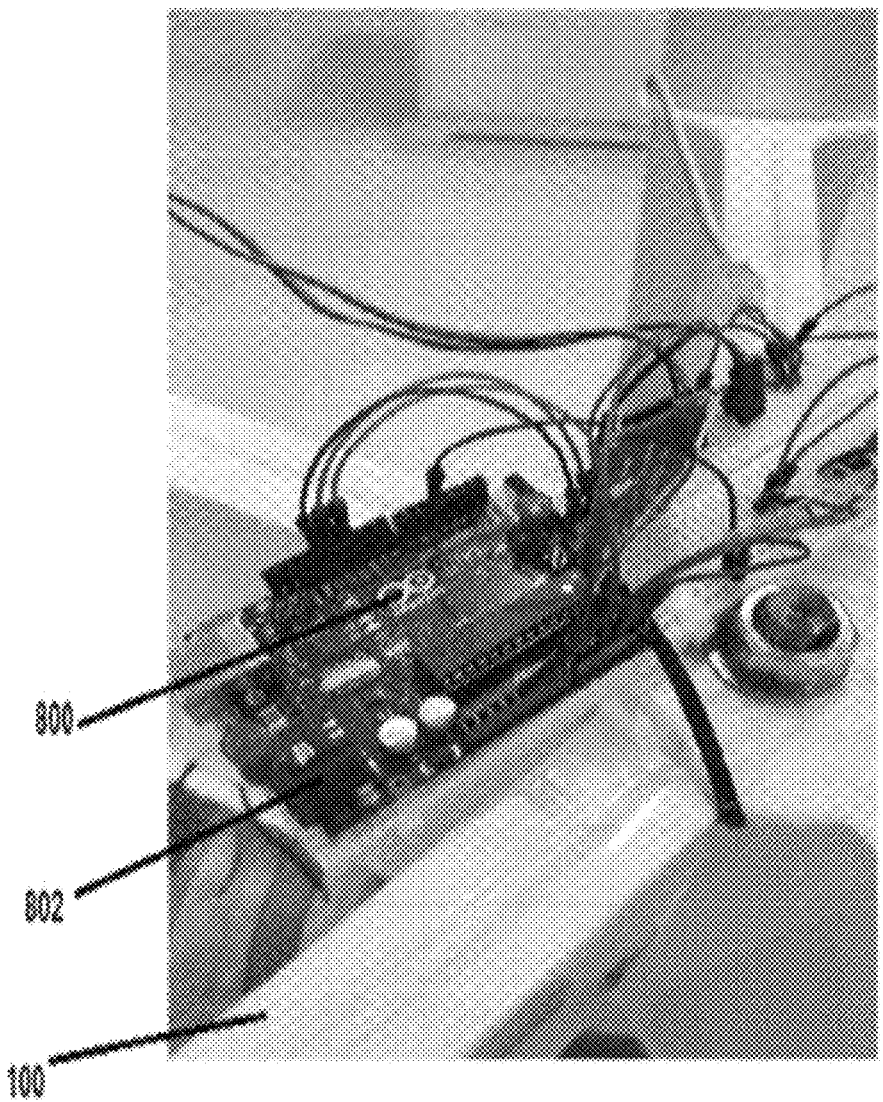
FIG. 8 shows an example controller.
Figure 9:
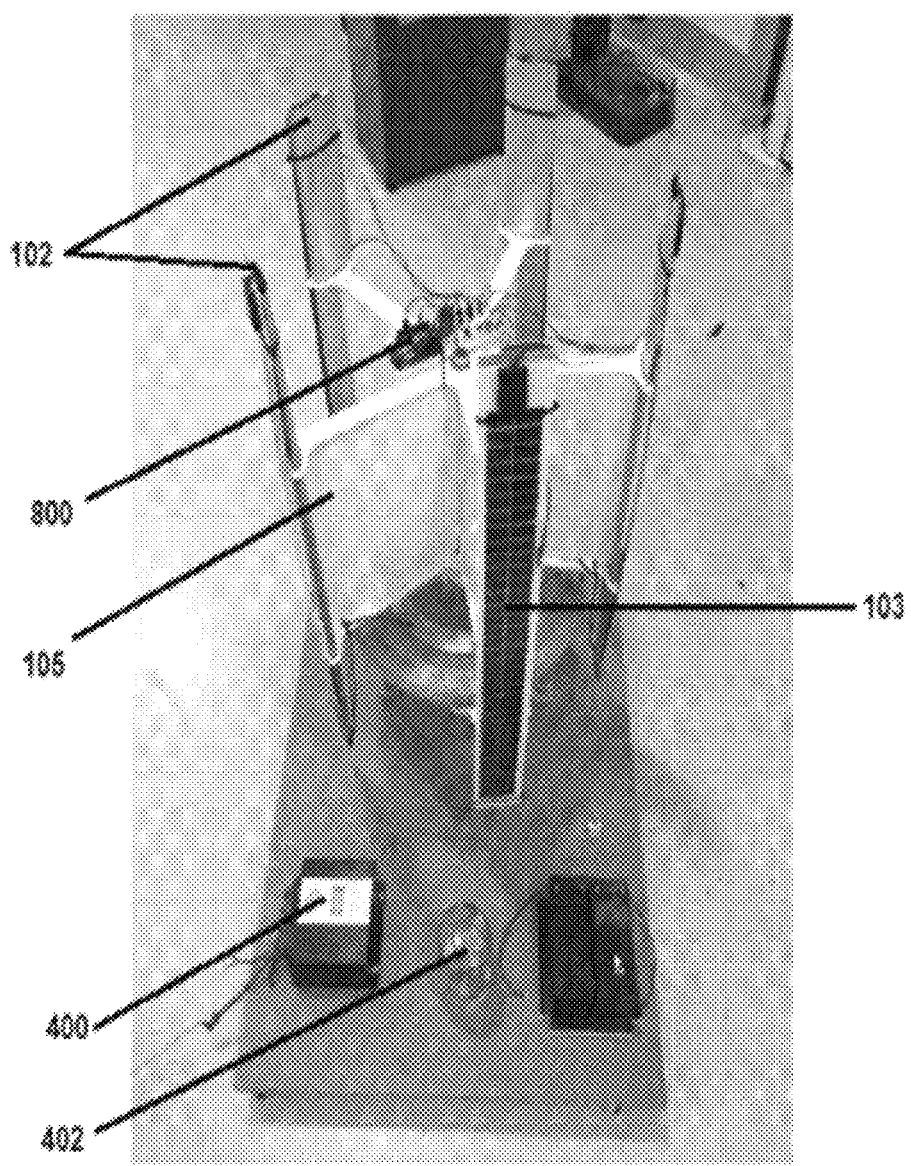
FIG. 9 shows an example photovoltaic-wind hybrid system.

As shown in FIG. 8, a breadboard circuit containing the Arduino Uno microcontroller 800 and the SD card 802 are mounted on the photovoltaic-wind hybrid turbine system 100 using cable ties. In addition, FIG. 9 shows a representation of the overall photovoltaic-wind hybrid turbine system 100. Manufacturing steps used to build the overall system include attaching five photovoltaic modules or panels to the blades of the wind turbine using two cable ties for each panel, one on the top and one on the bottom. Further, five sturdy and light cardboard sheets of dimensions 23.5 cm×30 cm are cut and each cardboard sheet is fitted into an empty space bounded by two horizontal aluminum frames holding the blade, vertical blade and vertical shaft of the turbine. Slip rings are fabricated by cutting a wooden board in a circular shape with a diameter of 42 cm and making a hole in the middle of the wooden board enough for the shaft of the wind turbine to pass through. Following this, two circular-even crevices are created on the circular wooden board (both 3 cm wide and about a few mm deep), the circular crevices about 3 cm apart. Two sanded and cleaned smooth copper rings that fit exactly into the crevices are taken and the structure is glued to the bottom the wind turbine placing the slip ring underneath the generator. Any friction associated with the slip rings is eliminated or minimized by polishing surfaces of the slip rings. The lower the friction the higher the speed of the wind turbines and therefore higher electrical output power. A wooden base is then fabricated by cutting a wooden sheet of dimensions 80 cm×60 cm.

In embodiments, for hybrid system 100, the wind turbine, the hybrid charge controller (HCC) and the battery are bolted down to the wooden base and an on/off switch is placed on top of the wooden base. Holes being drilled are made big enough to allow any wiring coming from the photovoltaic-wind hybrid turbine system to go underneath and to the hybrid charge controller (HCC) and battery.

In embodiments, an LM35 temperature sensor is a precision IC (integrated circuit) used which senses temperature by giving an output voltage directly proportional to Centigrade temperature. The LM35 temperature sensor does not require any calibration in order to obtain an error range of +/−0.25° C. at room temperature and +/−0.75° C. at a range of −55° C. to 150° C. which is an advantage over Kelvin calibrated temperature sensors since no subtraction is required to be performed from the output voltage to obtain a value in centigrade.

Figure 10:
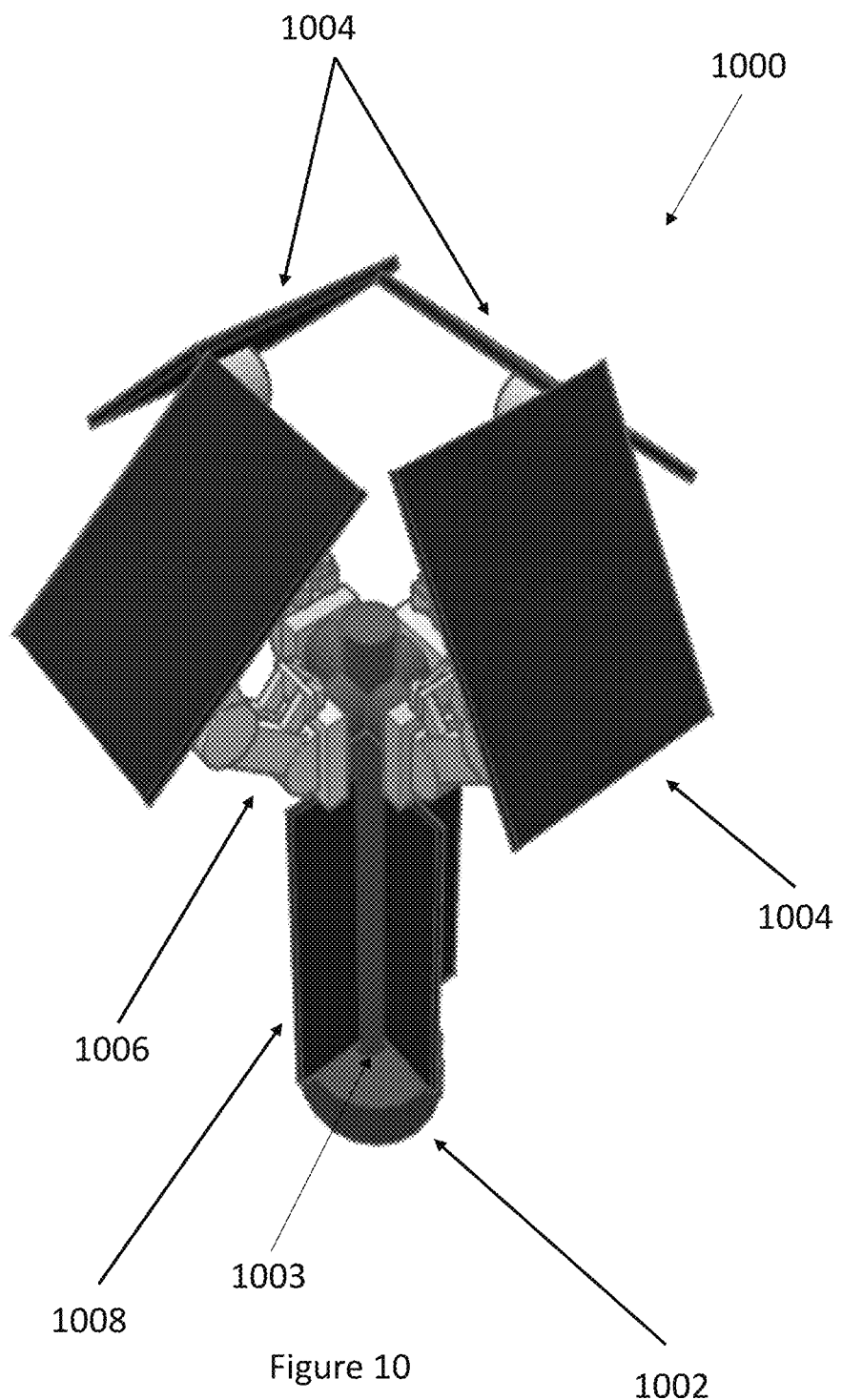
FIG. 10 shows an example photovoltaic-wind hybrid system.

FIG. 10 shows an example photovoltaic-wind hybrid system, system 1000. As show in FIG. 10, system 100 includes base 1002, shaft 1003, PV modules 1004, and arms 1006. In embodiments, shaft 1003 is attached to base 1002. In embodiments, arms 1006 are attached to shaft 1003, where each arm 1006 is attached to shaft 1003 and does not move or rotate when the remaining portions of each arm 1006 move. Thus, shaft 1003 is independent of the movement of each arm 1006.

In embodiments, each arm 1006 may move based on receive communications from a controller, such as microcontroller 800. In embodiments, each arm 1006 may move simultaneously in the same direction. In alternate embodiments, each arm 1006 may move independently of each other arm. Thus, for example, one arm 1006 may not move and another arm 1006 moves in an upwards or downwards direction. In embodiments, each of arms 1006 may each PV panel 1004 in move in two degrees of freedom based on the readings of solar sensors that may be attached to system 1000 and may send electronic information to a controller, such as microcontroller 800, which then sends electronic communications to one or more PV panels 1004. In embodiments, PV panels 104 may be tilted towards the center of system 1000 or away from the center of system 1000.

In addition, FIG. 10 also shows PV panels 1008. PV panels 1008 may be similar to PV panels 1004 and may be similar to PV module 103. As shown in FIG. 10, PV panels 1008 may be fixed to shaft 1003 and rotate with shaft 1003 when system 1000 receives wind speed. Accordingly, system 1000 has one set of upper PV modules (e.g., PV panels 1004) which can rotate to face the right direction of the sun. In embodiments, the upper PV modules can be sized to accommodate the load demand. In addition, system 100 has another set of lower PV modules (e.g., PV panels 1008) can rotate via wind speed/power. In embodiments, the lower PV modules rotate whenever the wind speed exceeds the cut-in speed of the wind turbine that consists of shaft 1003 and PV panels 1008.

Figure 11:
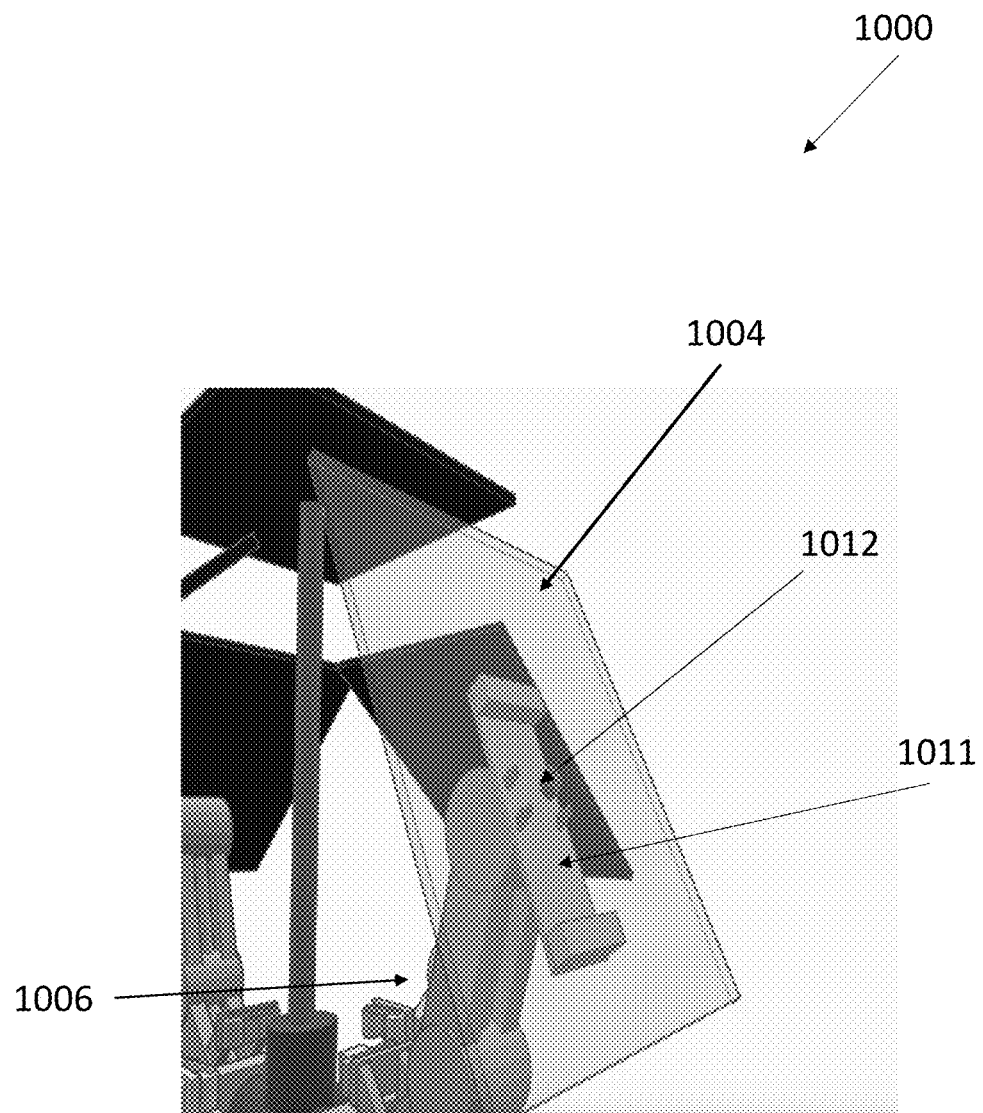
FIG. 11 shows an example photovoltaic-wind hybrid system.

FIG. 11 is a close-up perspective view of system 1000. As shown in FIG. 11, one of PV panels 1004 is shown as transparent to show how each PV panels 1004 connect to arm 1006. As shown in FIG. 11, a bracket 1011 may be attached to PV panel 1004. In embodiments, bracket 1011 may be glued on, soldered on, or fastened onto PV panel 104. As shown in FIG. 11, bracket 1011 may be attached to arm 1006 via bolts, screws, and/or another attaching mechanism that permits bracket 1011 to move in the same direction as arm 1006 when arm 1006 moves.

Figure 12:
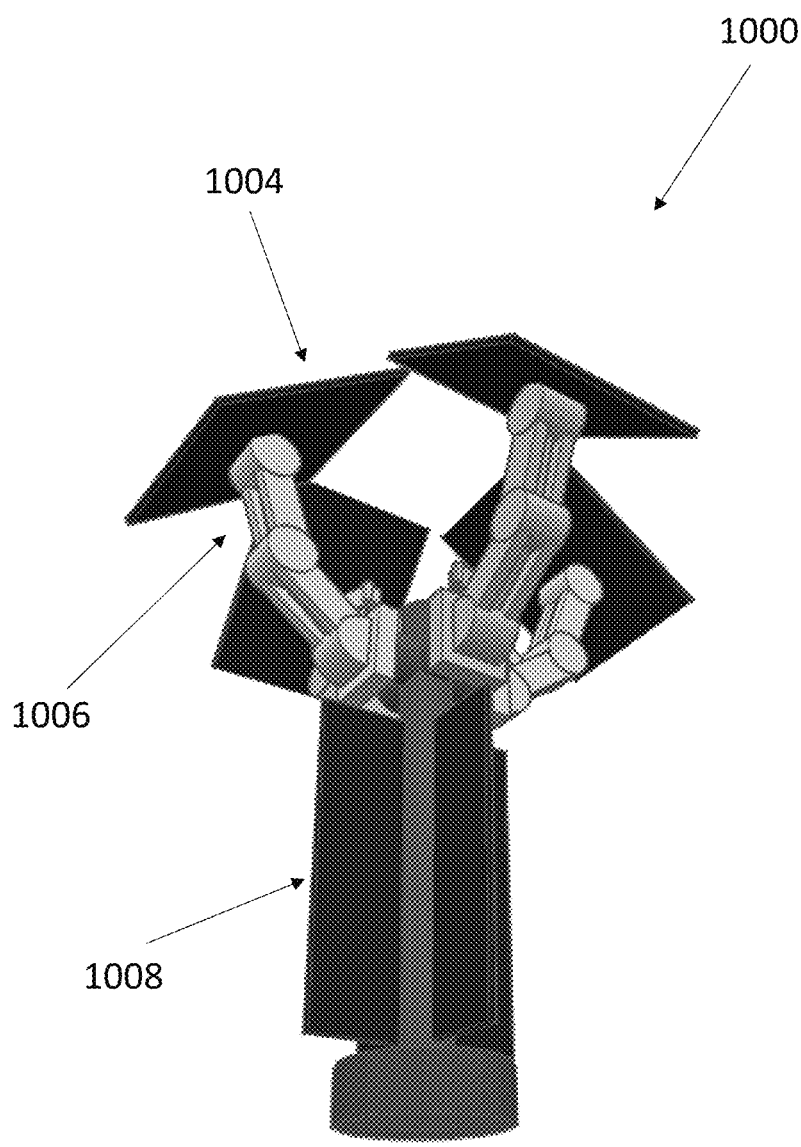
FIG. 12 shows an example photovoltaic-wind hybrid system.
Figure 13:
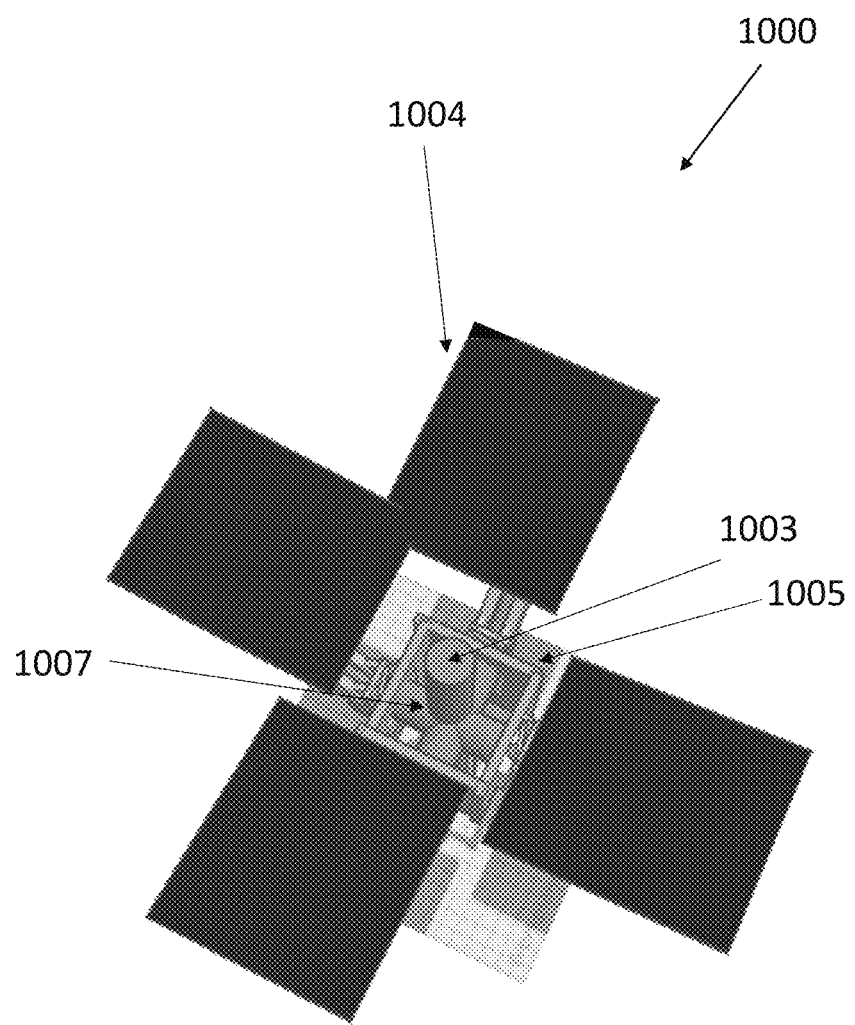
FIG. 13 shows an example photovoltaic-wind hybrid system.

FIG. 12 is another perspective view of system 1000. As shown in FIG. 12, a view of system 1000 is given as if someone is looking at system 1000 from the ground and looking up. FIG. 13 is another perspective view of system 1000. As shown in FIG. 13, a top perspective view of system 100 is given. As shown in FIG. 13, rod 1003 can be seen. In embodiments, the top of rod 1003 may be at the same level as PV modules 1004. As shown in FIG. 13, rod 1003 is enclosed by enclosure 1005 to which arms 1006 are also attached. In embodiments, rod 1003 connects via connectors 1007 that connect rod 1003 to enclosure 1005. In alternate embodiments, the top of rod 1003 may be higher than the surfaces of PV modules 1004. In alternate embodiments, the top of rod 1003 may be lower in height than the surfaces of PV modules 1004.

Figure 14:
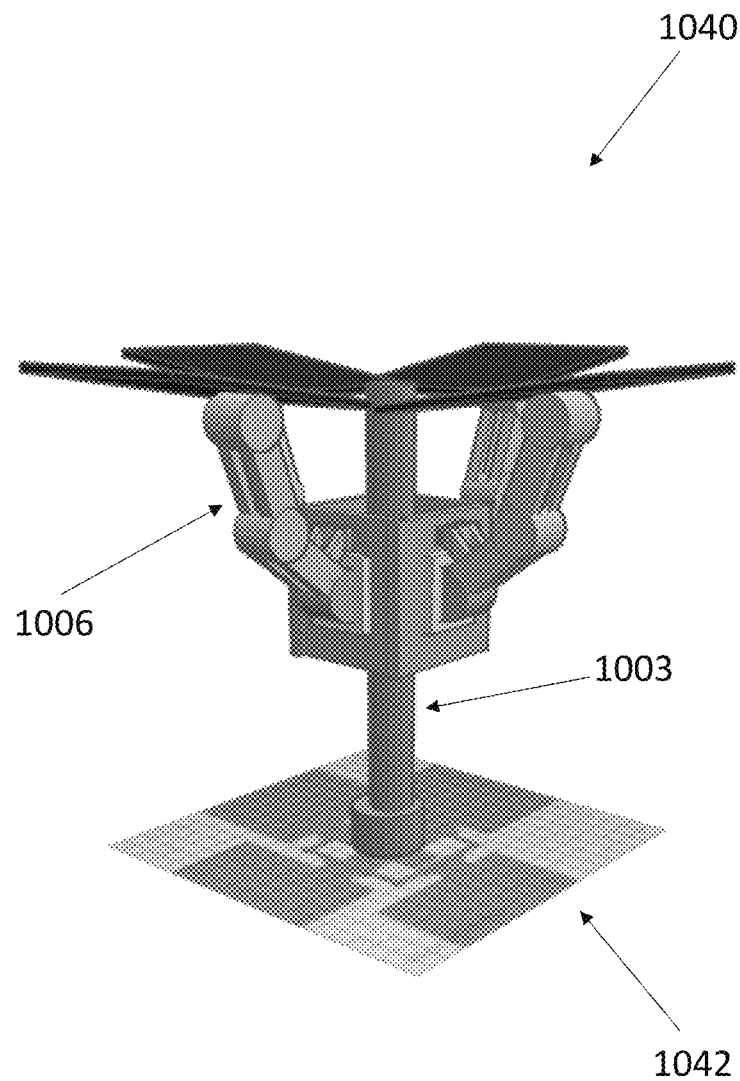
FIG. 14 shows an example photovoltaic-wind hybrid system.

FIG. 14 shows an example photovoltaic-wind hybrid system, system 1040. As shown in FIG. 14, no PV modules 1008 are attached. Also, as shown in FIG. 14, the top of rod 1003 is slightly above PV modules 1004 when PV modules 1004 are tilting towards rod 1003. Also, as shown in FIG. 14, system 1040 is attached to base 1042.

Figure 15:
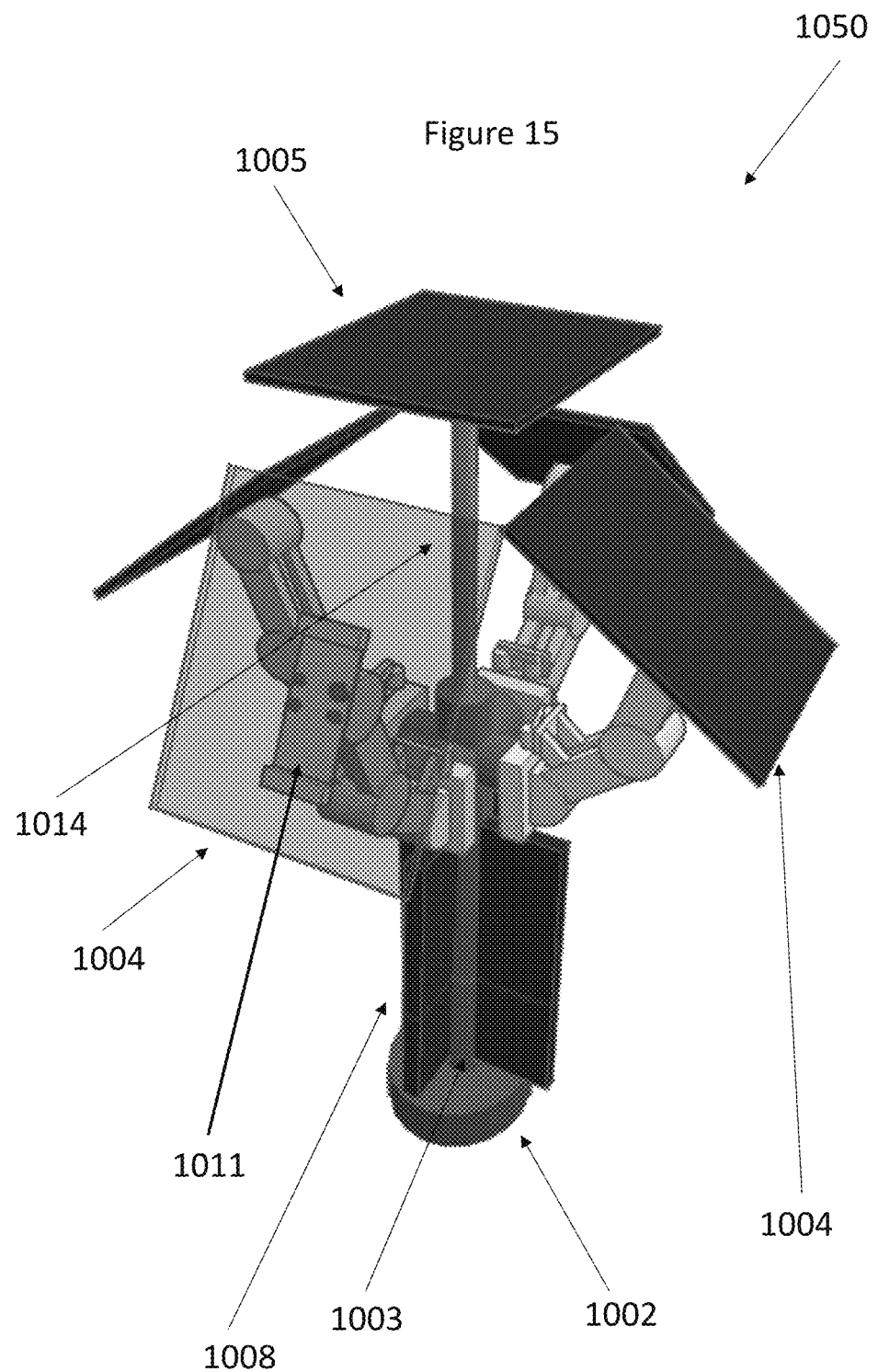
FIG. 15 shows an example photovoltaic-wind hybrid system.

FIG. 15 shows an example photovoltaic-wind hybrid system, system 1050. In embodiments, rod 1014 As shown in FIG. 15, rod 1014 is at a height that makes the top of rod 1014 greater than PV modules 1004. Also, as shown in FIG. 15, PV module 1005 is attached to rod 1014. In embodiments, PV module 1005 may be similar to PV module 1004. In embodiments, rod 1014 is attached to the top of rod 1003. In embodiments, rod 1014 may not rotate when rod 1003, or, alternatively, rod 1014 may rotate when rod 1003 rotates. In embodiments, the height of rod 1014 may be a particular height that prevents any shade being created by PV module 1005 onto the surfaces of any PV modules 1004.

Figure 16:
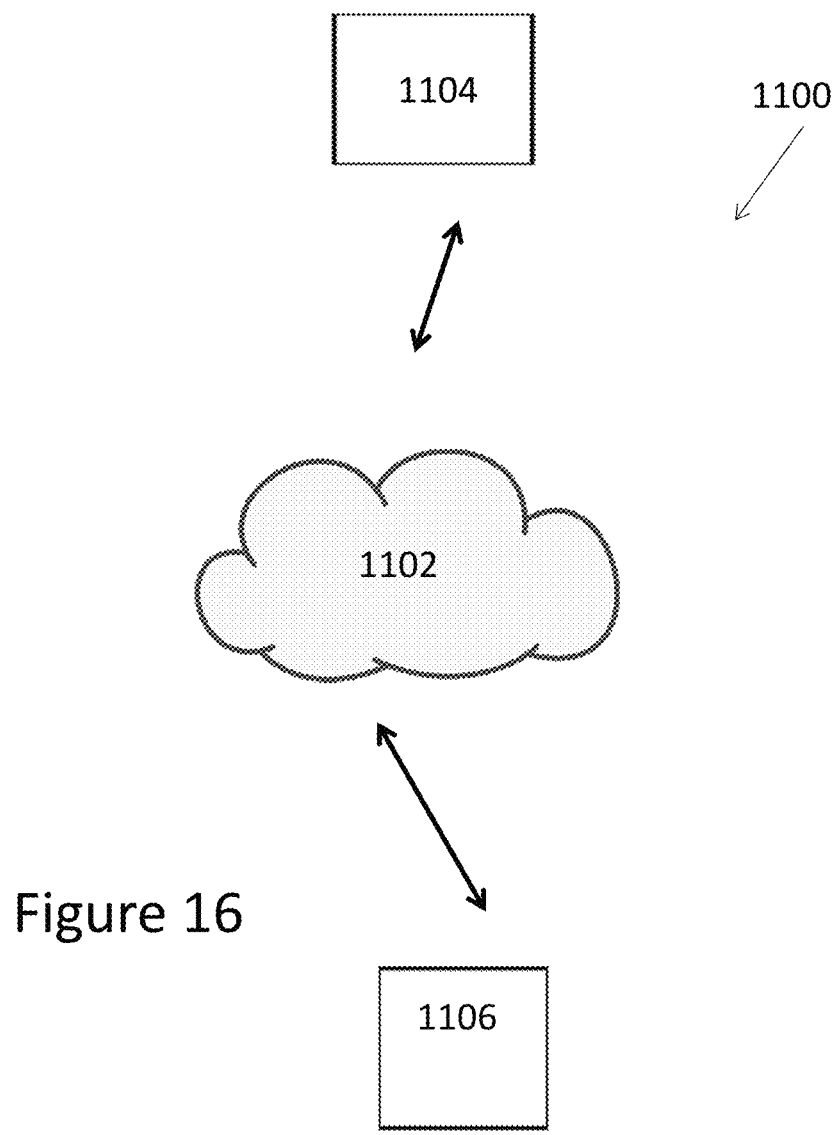
FIG. 16 is an example network system.

FIG. 16 is a diagram of example environment 1100 in which systems, devices, and/or methods described herein may be implemented. FIG. 16 shows network 1102, system 1104 and system 1106.

Network 1102 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light Fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or network 402 may include a cellular network, a public land mobile network (PLMN), a second-generation (2G) network, a third-generation (3G) network, a fourth-generation (4G) network, a fifth-generation (5G) network, and/or another network. In embodiments, network 1102 may allow for devices describe any of the described figures to electronically communicate (e.g., using emails, electronic signals, URL links, web links, electronic bits, fiber optic signals, wireless signals, wired signals, etc.) with each other to send and receive various types of electronic communications.

System 1104 (e.g., hybrid system 100, hybrid system 1000, etc.) may include one or more devices that can communicate and/or receive electronic information to/from device 1106 via network 1102. In embodiments, system 1104 may include controllers, sensors, and/or any other electronic device that may receive information to optimally generate power. In embodiments, system 1106 may be a computing device that can store electronic information that can generate various graphical and table features as described in one or more figures. In embodiments, system 1804 may send electronic information to system 1106, and, system 1106 may send electronic information to one or more features in system 1104. In embodiments, system 1106 may be attached to, or co-located, with system 1104.

Device 1106 may include any computation or communications device that is capable of communicating with a network (e.g., network 1102) with other device and/or systems, such as system 1104. For example, device 1106 may include a computing device, radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smartphone, a desktop computer, a laptop computer, a tablet computer, a camera, a digital watch, a digital glass, or another type of computation or communications device.

Device 1106 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 1106. Device 1106 may have a touch screen and/or a keyboard that allows a user to electronically interact with an electronic application. In embodiments, a user may swipe, press, or touch device 1106 in such a manner that one or more electronic actions will be initiated by device 1106 via an electronic application.

Device 1106 may include a variety of applications, such as, for example, a solar analyzer application, a wind flow analyzer application, a temperature application, a location analyzer, and/or other types of electronic applications that can be used to optimize a hybrid system described in one or more figures.

Figure 17:
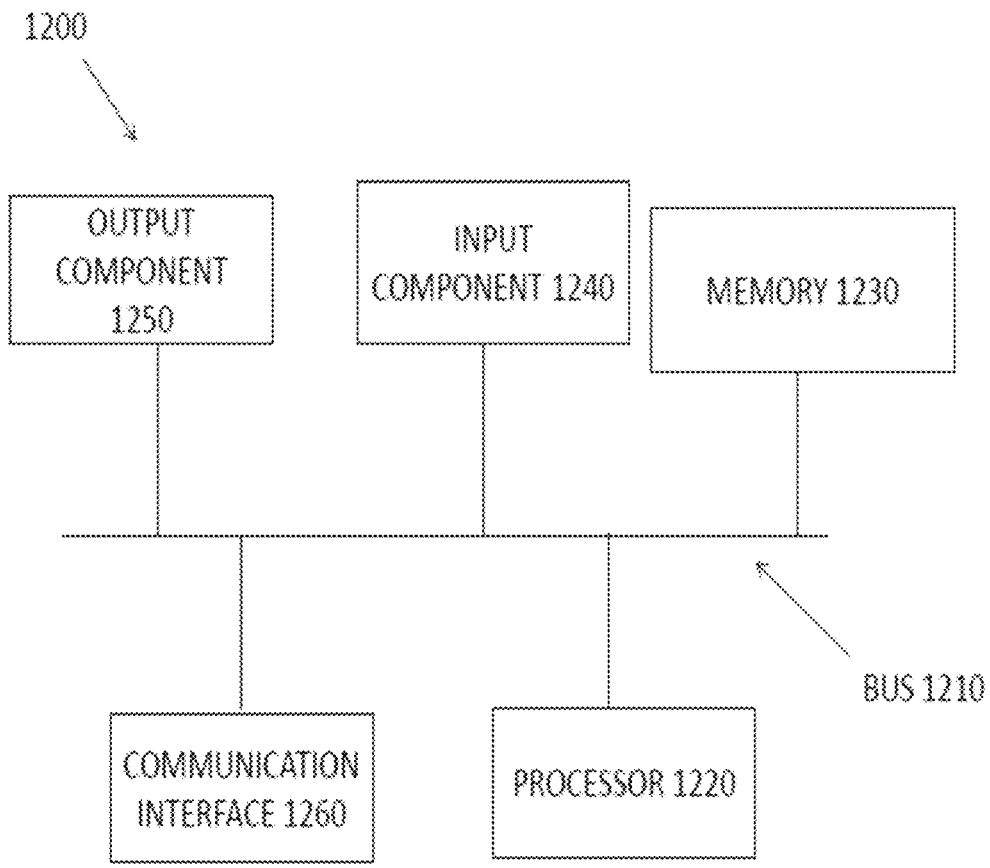
FIG. 17 is an example computing device.

FIG. 17 is a diagram of example components of system hybrid system 100 and hybrid system 1000. Device 120 may correspond to computing devices to a computing device feature that is part of systems 100, 1000, 1104, or 1106.

As shown in FIG. 17, device 1200 may include a bus 1210, a processor 1220, a memory 1230, an input component 1240, an output component 1250, and a communications interface 1260. In other implementations, device 1200 may contain fewer components, additional components, different components, or differently arranged components than depicted in FIG. 17. Additionally, or one or more components of device 1200 may perform one or more tasks described as being performed by one or more other components of device 1200.

Bus 1210 may include a path that permits communications among the components of device 1200. Processor 1220 may include one or more processors, microprocessors, or processing logic (e.g., a field-programmable gate array (FPGA) or an application-specific integrated circuit (ASIC)) that interprets and executes instructions. Memory 1230 may include any type of dynamic storage device that stores information and instructions, for execution by processor 1220, and/or any type of non-volatile storage device that stores information for use by processor 1920.

Input component 1240 may include a mechanism that permits a user to input information to device 1200, such as a keyboard, a keypad, a button, a switch, etc. Output component 1250 may include a mechanism that outputs information to the user, such as a display, a speaker, one or more light-emitting diodes (LEDs), etc.

Communications interface 1260 may include any transceiver-like mechanism that enables device 1900 to communicate with other devices and/or systems. For example, communications interface 1960 may include an Ethernet interface, an optical interface, a coaxial interface, a wireless interface, or the like.

In another implementation, communications interface 1260 may include, for example, a transmitter that may convert baseband signals from processor 1220 to radiofrequency (RF) signals and/or a receiver that may convert RF signals to baseband signals. Alternatively, communications interface 1260 may include a transceiver to perform functions of both a transmitter and a receiver of wireless communications (e.g., radiofrequency, infrared, visual optics, etc.), wired communications (e.g., conductive wire, twisted pair cable, coaxial cable, transmission line, fiber optic cable, waveguide, etc.), or a combination of wireless and wired communications.

Communications interface 1260 may connect to an antenna assembly (not shown in FIG. 12) for transmission and/or reception of the RF signals. The antenna assembly may include one or more antennas to transmit and/or receive RF signals over the air. The antenna assembly may, for example, receive RF signals from communications interface 1260 and transmit the RF signals over the air, and receive RF signals over the air and provide the RF signals to communications interface 1960. In one implementation, for example, communications interface 1260 may communicate with a network (e.g., wireless network, Internet, Intranet, etc.).

As will be described in detail below, device 1200 may perform certain operations. Device 1900 may perform these operations in response to processor 1220 executing software instructions (e.g., a computer program(s)) contained in a computer-readable medium, such as memory 1230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 1230 from another computer-readable medium or another device. The software instructions contained in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

As described in and for FIGS. 1 to 17, reference is made to the accompanying figures, which form a part hereof, and in which is shown by way of illustration specific embodiments in which the invention may be practiced. Whenever possible, the same reference numbers are used in the drawings and the description to refer to the same or like parts. Directional terminology, such as "top", "bottom", "front", "back", "leading", "trailing" etc., is used with reference to the orientation of the Figure(s) being described. Since components of embodiments of the present invention can be positioned in a number of different orientations, directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A hybrid wind and solar apparatus, comprising:
    a pole;
    multiple connectors, wherein each of the multiple connectors connect to the pole;
    an enclosure, wherein each of the multiple connectors connect to the enclosure;
    multiple arms, wherein each of the multiple arms includes a first elbow, a first arm segment, a second elbow, a second arm segment, and a third elbow, wherein:
        the first elbow attaches to the enclosure,
        the first arm segment attaches to the first elbow and the second elbow,
        the second arm segment attaches the second elbow and the third elbow, and
        the third elbow attaches to a one of multiple brackets;
    a first set of photovoltaic modules,
        wherein:
            each photovoltaic module within the first set of the photovoltaic modules is located:
                directly below each of the multiple arms, and
                below the enclosure;
    a second set of photovoltaic modules, wherein the second set of photovoltaic modules are configured not to rotate with the pole when the pole rotates, wherein:
        each other photovoltaic module within the second set of photovoltaic modules is connected to a bracket of the multiple brackets, wherein each of the brackets is connected to the third elbow of each of the arms, and
        each of the other photovoltaic modules within the second set of photovoltaic modules is configured to rotate between zero and 90 degrees based on positions of the first elbow, the second elbow, the third elbow, the first arm segment, and the second arm segment,
            wherein each of the other photovoltaic modules within the second set of photovoltaic modules is configured to range from a position being perpendicular to the pole to another position wherein each of the other photovoltaic modules within the second set of photovoltaic modules is located above the connecting pole.

2. The hybrid wind and solar apparatus of claim 1, further comprising:
    a third singular photovoltaic module that connects to the top of the pole, wherein the third singular photovoltaic module's location is configured to prevent creating any shade over any of the other photovoltaic modules within the second set of photovoltaic modules.

3. The hybrid wind and solar apparatus of claim 2, wherein the second set of photovoltaic modules are configured to be at a maximum position above the pole such that the second set of photovoltaic modules are at a similar plane of the third singular photovoltaic module.

4. The hybrid wind and solar apparatus of claim 1, wherein the apparatus includes a vertical axis wind turbine, and wherein each of the second set of photovoltaic modules is attached to a blade of the vertical axis wind turbine.

5. The hybrid wind and solar apparatus of claim 4, wherein size dimensions of each of the photovoltaic modules that are part of the first set of photovoltaic modules are equal to other size dimensions of blades connected to the pole.

6. The hybrid wind and solar apparatus of claim 1, wherein the second set of photovoltaic modules are configured to change positions of the first elbow, the second elbow, and the third elbow based on a location of the sun.

7. The hybrid wind and solar apparatus of claim 1, wherein a surface of a particular photovoltaic module, of the first set of photovoltaic modules, is never parallel to another surface of another particular photovoltaic module of the second set of photovoltaic modules.

8. The hybrid wind and solar apparatus of claim 7, wherein the particular photovoltaic module is directly below the other particular photovoltaic module.

9. The hybrid wind and solar apparatus of claim 1, wherein the first set of photovoltaic modules are configured to rotate around the pole and the second set of photovoltaic modules are configured not to rotate around the pole.

10. The hybrid wind and solar apparatus of claim 1, wherein the second set of photovoltaic modules are configured to move in a plane that is perpendicular to the pole.

11. The hybrid wind and solar apparatus of claim 1, wherein a surface of any of the other photovoltaic modules that are part of the second set of photovoltaic modules never face any surface of the photovoltaic modules that are part of the first set of photovoltaic modules.

12. A method, comprising:
    attaching a pole to an enclosure via multiple connectors;
    attaching an arm to the enclosure, wherein the arm includes a first elbow, a first arm
    segment, a second elbow, a second arm segment, and a third elbow, wherein:
        the first elbow attaches to the enclosure,
        the first arm segment attaches to the first elbow and the second elbow,
        the second arm segment attaches the second elbow and the third elbow, and
        the third elbow below attaches to a bracket
    attaching a first photovoltaic module to the arm, wherein the first photovoltaic module is located directly below the first elbow; and;
    attaching a second photovoltaic module to the bracket, wherein the second photovoltaic module moves in a different plane than the first photovoltaic module.

13. The method of claim 12, further comprising:
    attaching a third photovoltaic module to a top portion of the pole, wherein the top
    portion of the pole does not rotate.

14. The method of claim 12, further comprising:
    attaching a bottom portion of the pole to a base, wherein the bottom portion of the pole rotates based on wind power.

* * * * *